(12) United States Patent
Inoue

(10) Patent No.: US 7,686,263 B2
(45) Date of Patent: Mar. 30, 2010

(54) LEG DEVICE

(75) Inventor: Yasuhiko Inoue, Toyonaka (JP)

(73) Assignee: Nifco Inc., Yokohama, Kanagawa (JP)

( * ) Notice: Subject to any disclaimer, the term of this patent is extended or adjusted under 35 U.S.C. 154(b) by 1248 days.

(21) Appl. No.: 11/212,846

(22) Filed: Aug. 29, 2005

(65) Prior Publication Data

US 2006/0043251 A1 Mar. 2, 2006

(30) Foreign Application Priority Data

Aug. 30, 2004 (JP) ............................. 2004-249940

(51) Int. Cl.
*F16M 11/24* (2006.01)
(52) U.S. Cl. ................... 248/188.2; 248/188.8
(58) Field of Classification Search ............. 248/188.1, 248/188, 188.2, 188.4
See application file for complete search history.

(56) References Cited

U.S. PATENT DOCUMENTS

| 4,991,805 | A  | * | 2/1991 | Solak et al. | ............... | 248/188.4 |
| 5,000,416 | A  | * | 3/1991 | Fantasia | ..................... | 248/650 |
| 6,871,826 | B2 | * | 3/2005 | Oyama et al. | ............ | 248/188.8 |
| 6,874,739 | B1 | * | 4/2005 | Gregory | .................. | 248/188.4 |
| 6,902,140 | B1 | * | 6/2005 | Huang | ..................... | 248/188.4 |
| 7,159,829 | B1 | * | 1/2007 | Finkelstein | .............. | 248/188.4 |
| 7,178,768 | B2 | * | 2/2007 | Inoue | ..................... | 248/188.4 |
| 7,198,238 | B2 | * | 4/2007 | Inoue | ..................... | 248/188.4 |
| 7,258,313 | B2 | * | 8/2007 | Gabriel | ..................... | 248/188.2 |

FOREIGN PATENT DOCUMENTS

| JP | 11-82881 | | 3/1999 |
| JP | 2003014191 A | * | 1/2003 |
| JP | 2003049811 A | * | 2/2003 |
| JP | 2003-311092 | | 11/2003 |

* cited by examiner

*Primary Examiner*—J. Allen Shriver, II
*Assistant Examiner*—Steven M Marsh
(74) *Attorney, Agent, or Firm*—Manabu Kanesaka

(57) ABSTRACT

A leg device for height-adjustably supporting a supported object includes a leg shaft having a male thread portion, and an ascending/descending body supported on the leg shaft to be capable of ascending and descending. The ascending/descending body includes a base having a fixing part to be fixed to the supported object, a through hole for receiving the leg shaft therein, and an elastic piece, a lock body, and a release body. The lock body has an upper part pivotally assembled onto the base, and a female screw part engageable with the male thread portion. The lock body is pushed by the elastic piece toward the leg shaft inserted into the through hole. The release body has an operating part projecting outward from the base, and a striking part positioned inside the base. The release body can be operated to release the lock body.

2 Claims, 18 Drawing Sheets

LEG DEVICE

BACKGROUND OF THE INVENTION AND RELATED ART STATEMENT

This invention relates to an improvement of a leg device, which is attached to various kinds of supported objects to become a leg of these supported objects, and also has a function of supporting such supported objects to be capable of height adjustment.

As a leg device, comprising a male screw-shaped leg shaft having a ground part on the lower end part, and an ascending/descending body supported on this leg shaft to be capable of ascending and descending, and constituted such that:

this ascending/descending body is constituted by a base, which has a fixing part for a supported object and also has a pass-through/slip-out hole for the leg shaft, and a lock body has the upper end part assembled onto this base to be capable of rotation and also has a female screw-shaped part which engages with the male screw part of the leg shaft on the front face side of the lower end part; and an elastic piece contacts on the back face of this lock body so as to push the female screw-shaped part of the lock body against the outer perimeter surface of the leg shaft inserted through said pass-through/slip-out hole and is integrally formed on such base, there is one shown in Patent Document 1 which the present applicant has previously filed.

By such leg device, with three parts, which is said leg shaft, base, and lock body, a supported object can be supported to be capable of height adjustment.

Here, in such leg device, if the engagement between the leg shaft and the lock body could be made compulsorily releasable by external operation, the amount that the leg shaft sticks out from the underside of the supported object could be easily adjusted within a great range, and its convenience of use could be further improved.

Patent Document 1: Japanese Patent Application No. 2004-158867

The main features that this invention attempts to solve is to make it possible to easily adjust within a great range the amount that the leg shaft sticks out from the underside of a supported object, in a manner such that the engagement between the leg shaft and the lock body constituting this can be compulsorily released by external operation, without uselessly increasing the number of constituent parts of this kind of leg device.

SUMMARY OF THE INVENTION

In order to solve the problem, in this invention, the leg device has been made to have the constitutions of (1)-(5) below.

(1) it is a leg device for supporting a supported object to be capable of height adjustment;

(2) it comprises a male screw-shaped leg shaft, which has a ground part on the lower end part, and an ascending/descending body, which is supported on this leg shaft to be capable of ascending and descending;

(3) this ascending/descending body comprises:

a base, which has a fixing part to the supported object and also has a pass-through/slip-out hole for the leg shaft; and a lock body, which has the upper end part assembled onto this base to be capable of rotation and also has a female screw-shaped part which engages with the male screw part of the leg shaft on the front face side of the lower end part;

(4) the base has integrally formed of an elastic piece, which contacts on the back face of this lock body so as to push the female screw-shaped part of the lock body against the outer perimeter surface of the leg shaft inserted through the pass-through/slip-out hole; and (5) a release body, which has an operating part made to stick outward from the side of this base and a striking part which is positioned inside the base, and also is moved by a release operation using this operating part to a release position in which the striking part is caused to strike the lock body so as to cause the lower end part of this lock body to move backward in opposition to the pushing of the elastic piece, is provided on the base.

By such constitution, a leg device can be constituted, in which the leg shaft is inserted into the pass-through/slip-out hole of the ascending/descending body while causing the lock body to move backward by causing the elastic piece to be elastically deformed outward, whereby the lock body is pushed forward by the elastic return of the elastic piece after this insertion. The female screw-shaped part of this lock body is pushed against and engaged with the male screw part of the inserted leg shaft. In the leg device attached to the supported object by the fixing part of the base, by rotationally operating the leg shaft, the measurement between the underside of the ascending/descending body and the ground part of the leg shaft is changed, whereby micro-adjustment of the height of the supported object is made possible. Also, the locked state of the lock body, in which the female screw-shaped part is caused to be engaged with the male screw part of the leg shaft by the pushing of the elastic piece, can be released with one touch by moving the lower end part of this lock body by operating the release body to move to the release position. Also, by this release, adjustment in which the amount that the leg shaft sticks out from the underside of the ascending/descending body is increased or decreased, that is, adjustment in which the height of the supported object is made changeable, can be performed within a great range.

The leg device may be provided with push-back means for the release body, which allows movement of the release body to the release position by release operation of the release body while being elastically deformed by this movement.

In this structure, when the release operation of the release body is stopped, the release body which was moved to the release position can be returned quickly to the position before this movement by the elastic return of such push-back means. Also, by the return of this release body, the lower end part of the lock body is moved forward again by the elastic piece whereby the female screw-shaped part of this lock body can be caused to be engaged with the male screw part of the leg shaft. That is, in this structure, the supported body can be positioned quickly and stably at a desired height by performing adjustment in which the height of the supported object is made changeable within a great range by the release operation of the release body, and then stopping this release operation at the position where this height has become the desired height.

The lock body may be made so as to push its lower end part against the leg shaft from one side sandwiching this leg shaft inside the base; and the release body is constituted as a slider body, which is combined on the base to be capable of sliding movement from the other side sandwiching this leg shaft toward the one side and causes its striking part to strike the lock body in the release position.

In this structure, the lock body can be moved backward with one touch by using the operating part to cause the slider body to move sliding from the other side sandwiching the leg shaft toward the one side, whereby the engagement between the female screw-shaped part of the lock body and the male screw part of the leg shaft is released, and changing of the height of the supported object within a great range can be performed.

The release body may be constituted as a rotating body, which is combined on the base to be capable of rotating by means of a rotating shaft, and has an operating part on one side sandwiching this rotating shaft and a striking part on the other side, and causes its striking part to strike the lock body from above in the release position by a release operation of lifting up the operating part.

In this structure, the lock body can be moved backward with one touch by causing rotational operation of the rotating body, in which the operating part is lifted upward and consequently the striking part is pushed downward, whereby the engagement between the female screw-shaped part of the lock body and the male screw part of the leg shaft is released, and changing of the height of the supported object within a great range can be performed.

The lock body may be made so as to push its lower end part against the leg shaft from one side sandwiching this leg shaft inside the base. This base has a guide part, which guides the sliding movement of a release body that is constituted as a slider body, which is combined on the base to be capable of sliding movement from the other side sandwiching this leg shaft toward the one side and causes its striking part to strike the lock body in the release position; and a shaft bearing hole for the rotating shaft of a release body that is constituted as a rotating body, which is combined on this base to be capable of rotating by means of a rotating shaft, and has an operating part on one side sandwiching this rotating shaft and a striking part on the other side, and causes its striking part to strike the lock body from above in the release position by a release operation of lifting up the operating part.

Also, a leg device can be constituted, in which the release body is made as a slider body, by assembling the slider body on such base, and in addition, a leg device also can be constituted, in which the release body is made as a rotating body, by assembling the rotating body on such base. That is, two kinds of leg devices having different constitutions of the release body can be suitably constituted respectively while using the base as a common part.

By this invention, with four parts, which are a leg shaft having a male screw part, a base as a constituent of an ascending/descending body, a lock body as a constituent of the ascending/descending body, and a release body as a constituent of the ascending/descending body, it is possible to suitably constitute a leg device that supports a supported object to be capable of height adjustment and in addition is capable also of adjustment in which the height of the supported object is made changeable within a great range by compulsorily releasing the engagement between the leg shaft and the lock body by external operation

DETAILED DESCRIPTION OF PREFERRED EMBODIMENTS

Below, preferred embodiments for implementing this invention is explained based on FIG. 1 through FIG. 19.

Figure 10A:
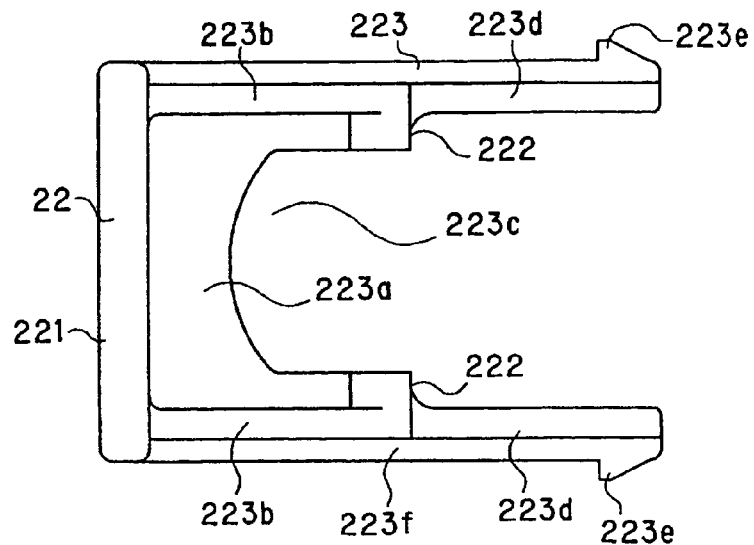
FIG. 10(*a*) is plan view of a slider body, FIG. 10(*b*) is front view thereof, and FIG. 10(*c*) is a right side view thereof.
Figure 10B:
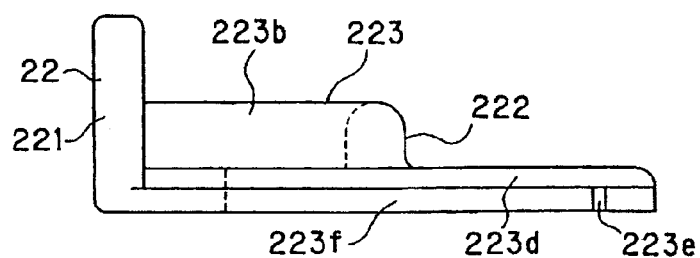
Figure 10C:
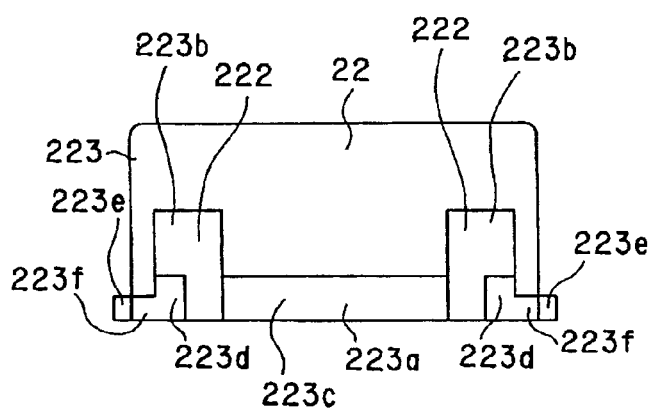
Figure 11:
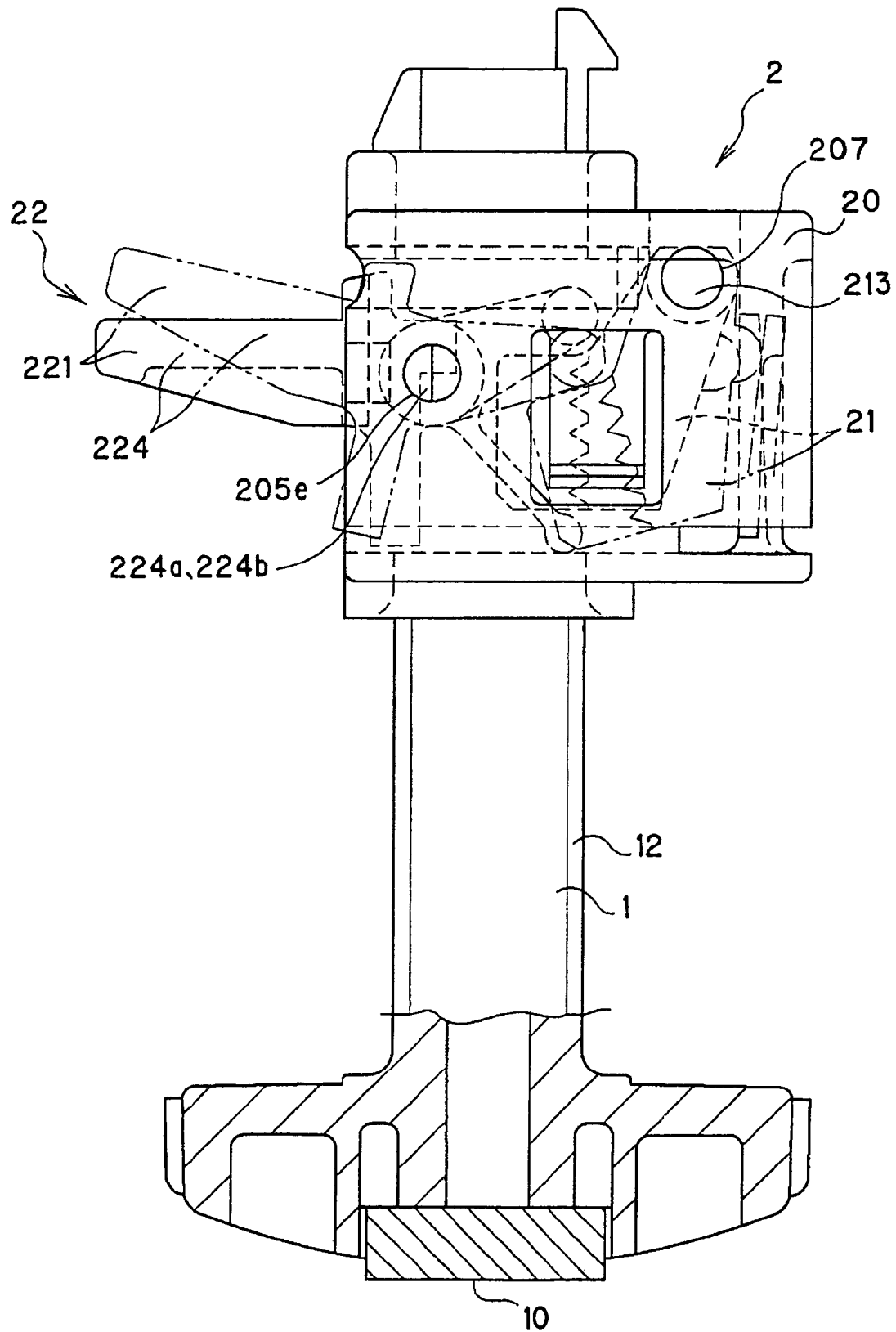
FIG. 11 is a side view of leg device (leg device having rotating body 224)
Figure 12:
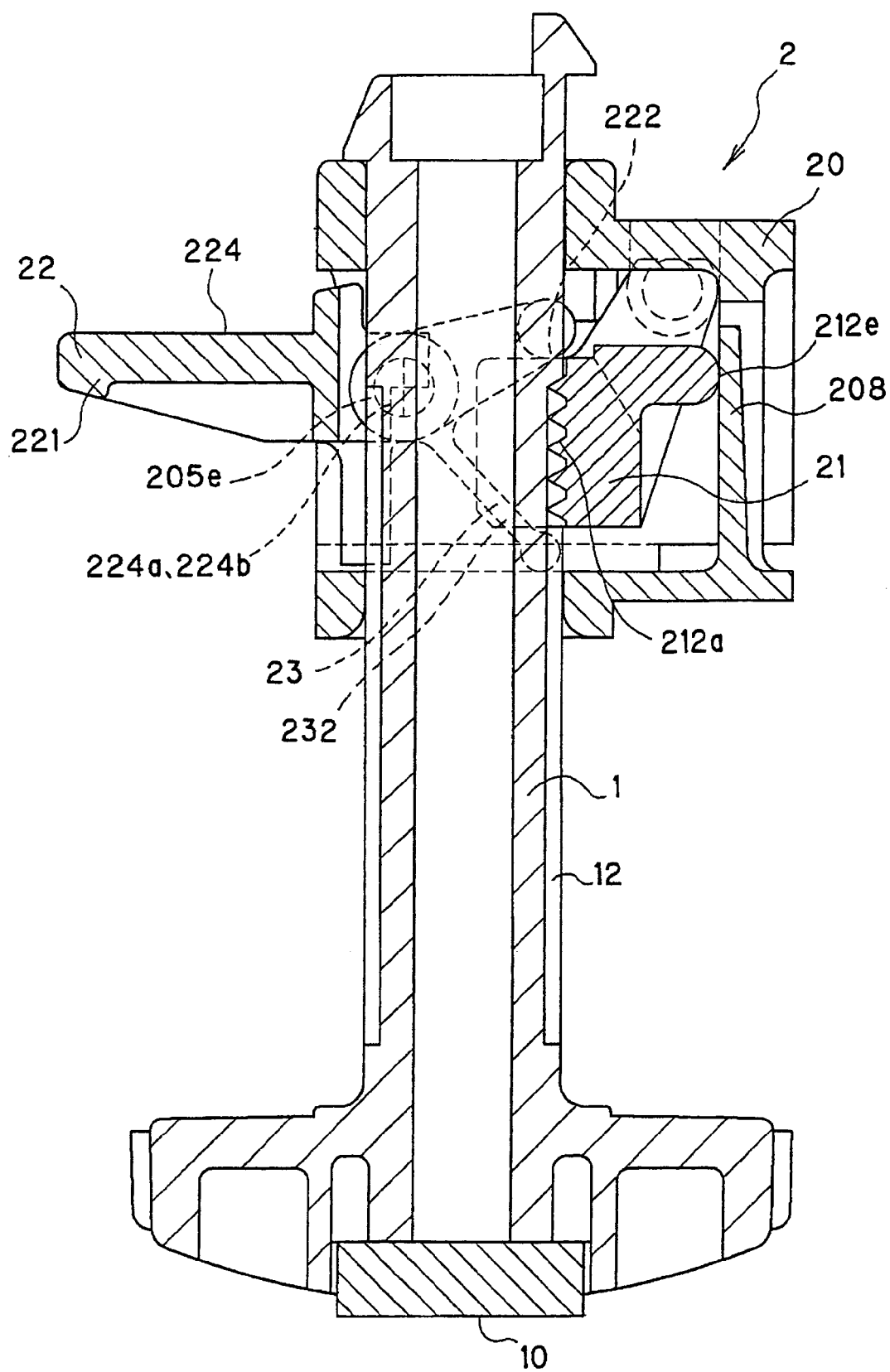
FIG. 12 is a side sectional view of same.

FIG. 1 through FIG. 4 respectively show the leg device in the state before attachment of the release body. Also, FIG. 5 through FIG. 9 respectively show a leg device having a release body 22 constituted as a slider body 223. Also, FIG. 10 shows such slider body 223.

Figure 16:
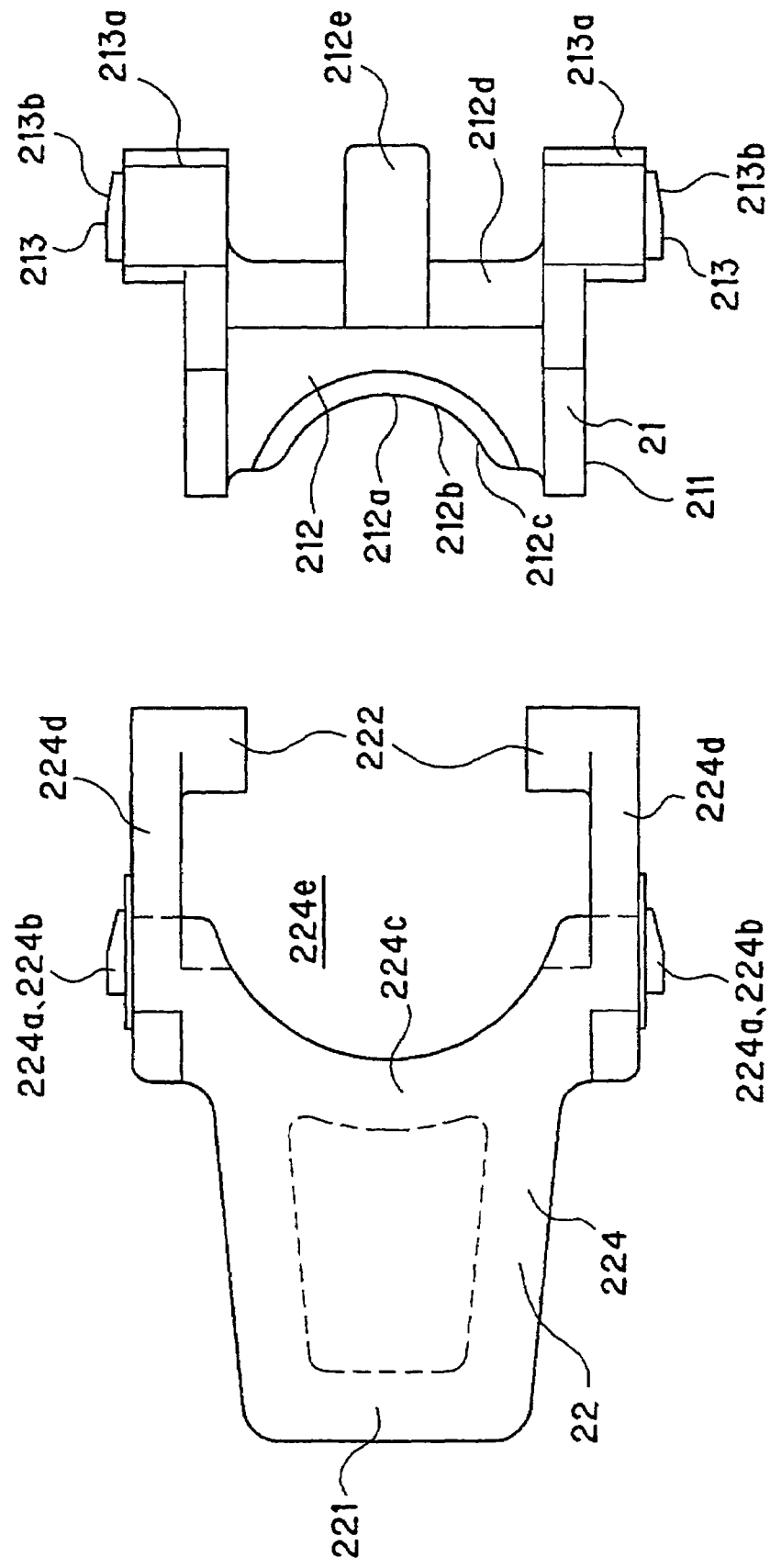
FIG. 16 is a plan view of rotating body 224 and lock body 21.
Figure 17:
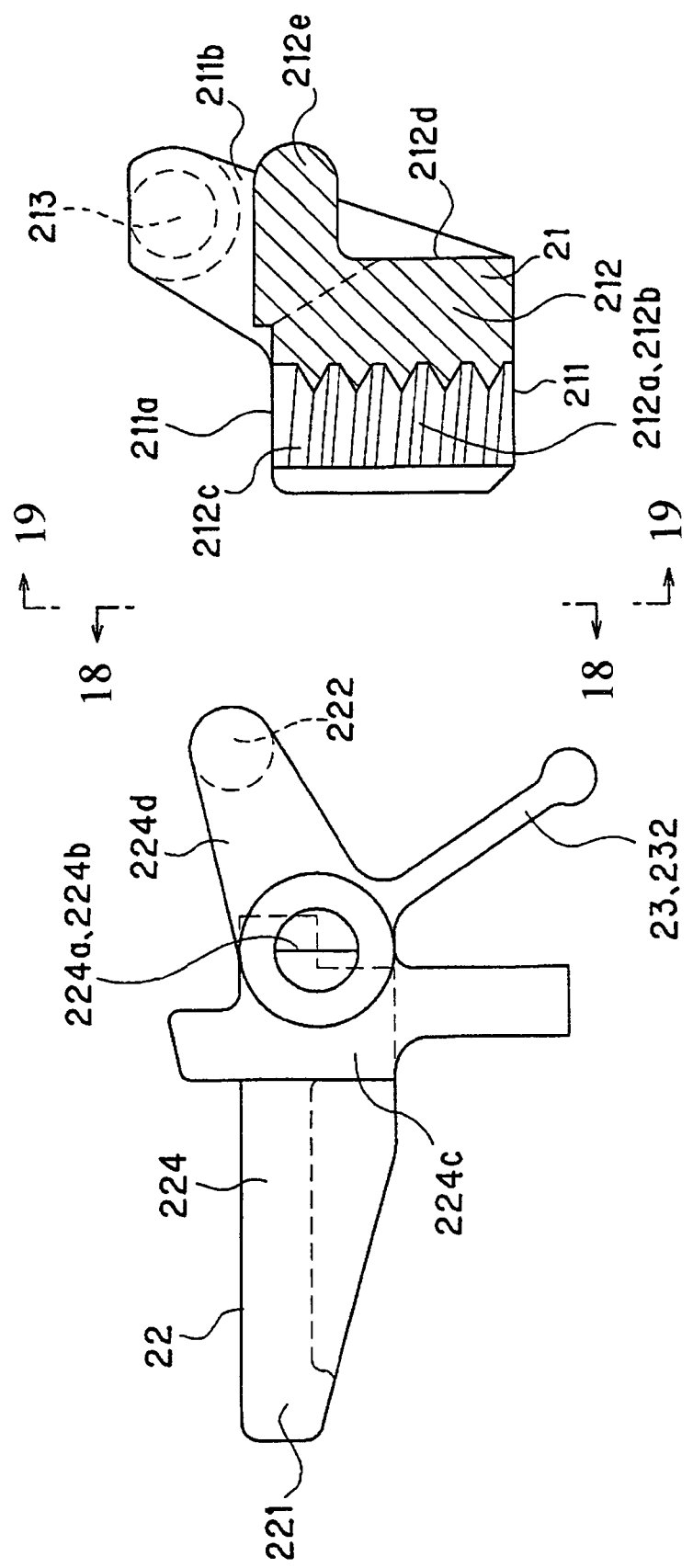
FIG. 17 is a front view of same (section of lock body 21)
Figure 18:
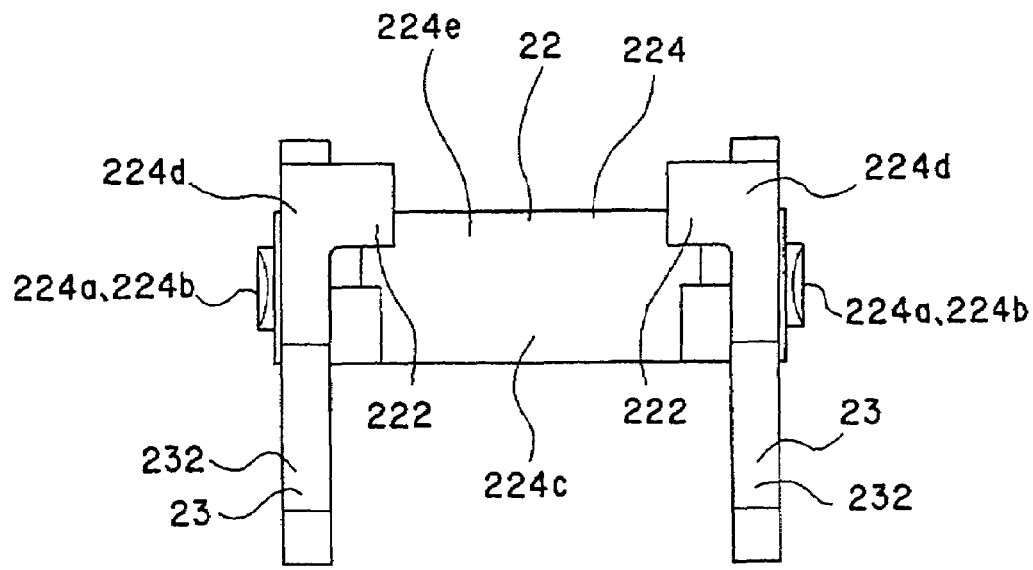
FIG. 18 is a side view taken along line 18-18 in FIG. 17.
Figure 19:
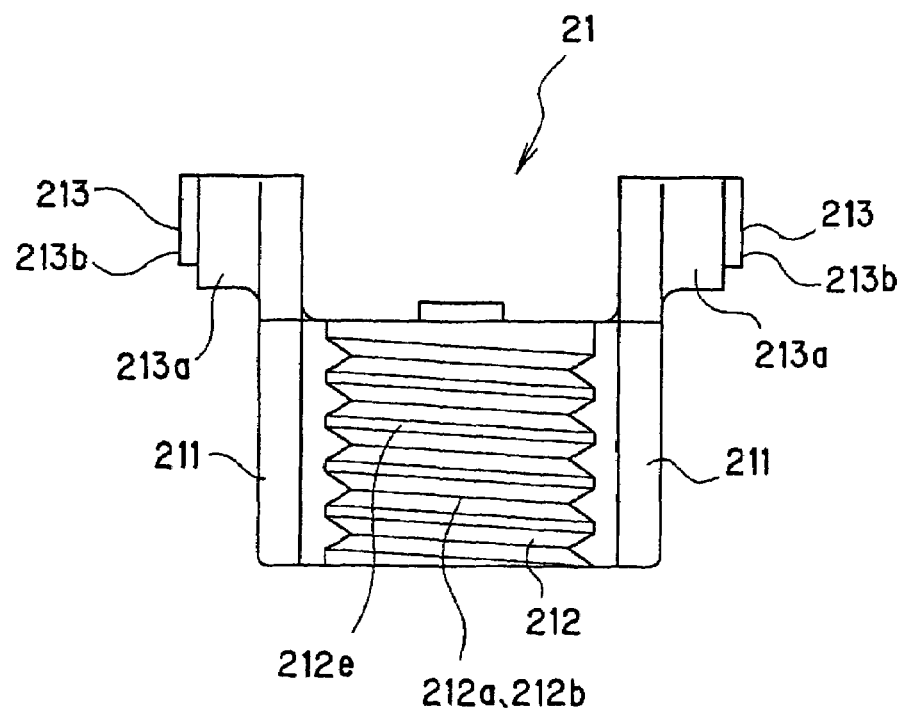
FIG. 19 is a side view taken along line 19-19 in FIG. 17.

Also, FIG. 11 through FIG. 15 respectively show a leg device having a release body 22 constituted as a rotating body. Also, FIG. 16 and FIG. 17 show such rotating body 224 and lock body 21 represented together. Also, FIG. 18 shows such rotating body 224, and FIG. 19 shows such lock body 21.

Figure 1:
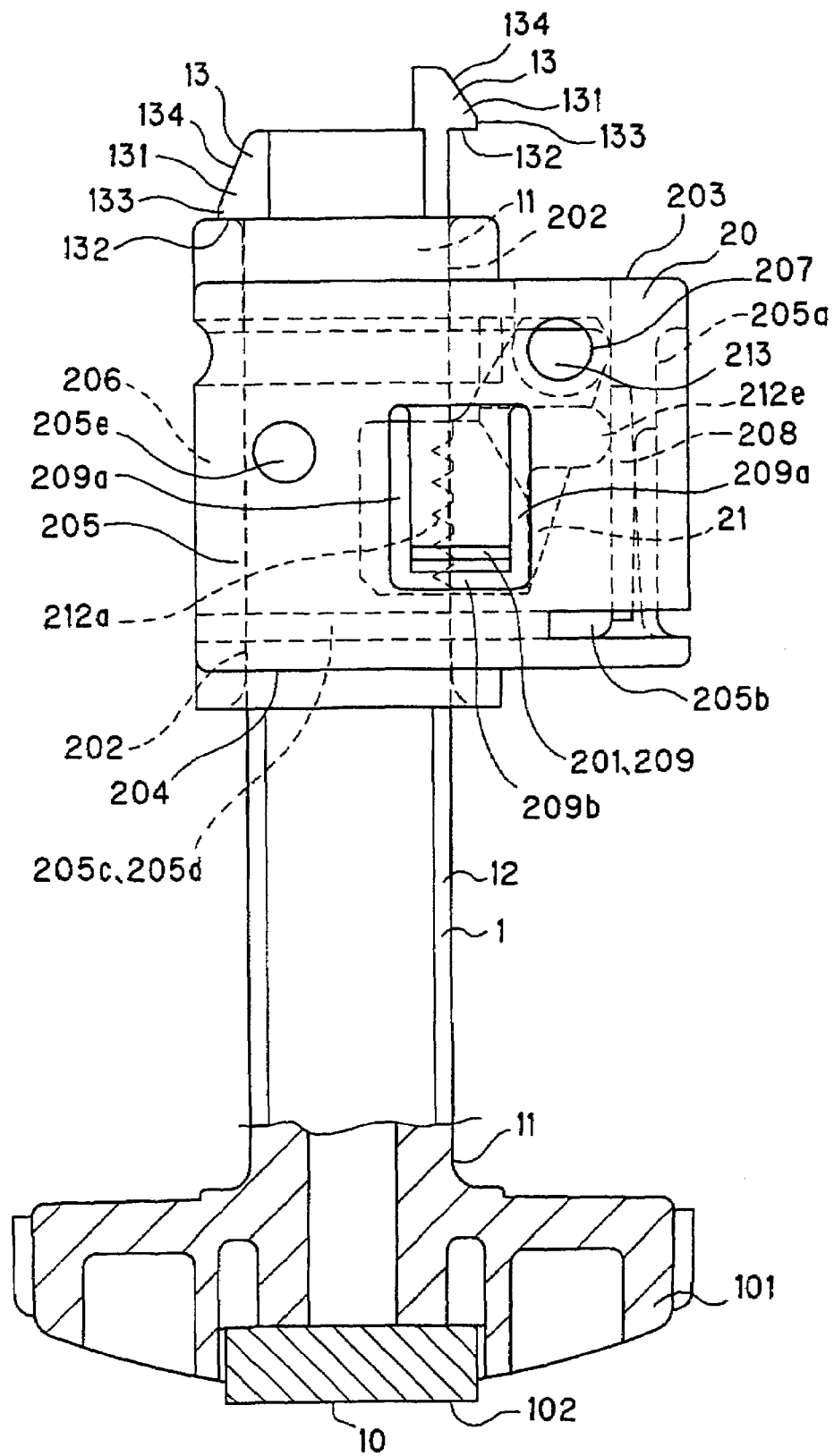
FIG. 1 is a side view of a leg device (before attachment of release body 22)
Figure 2:
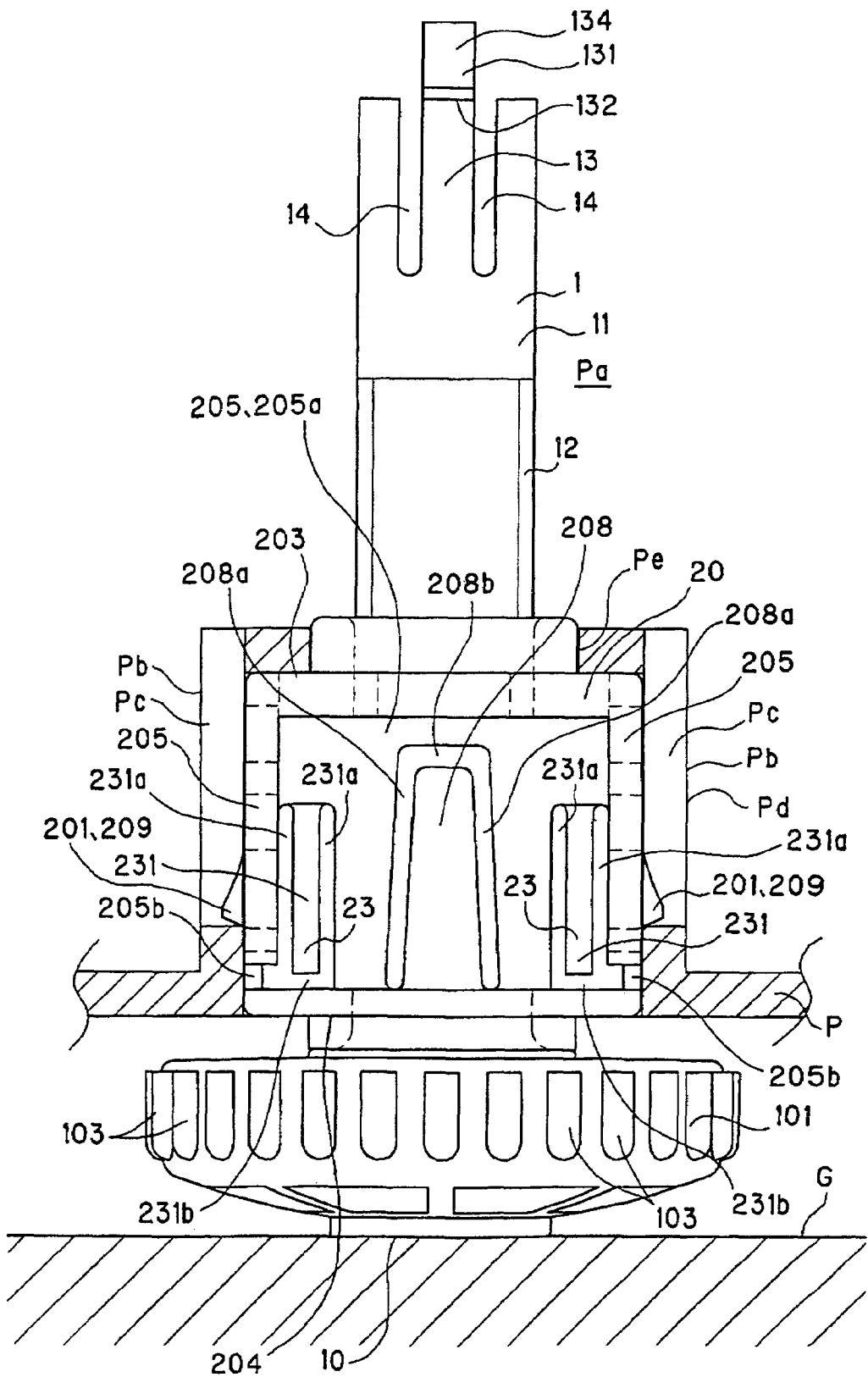
FIG. 2 is a sectional right side view of essential components showing use condition of same.
Figure 3:
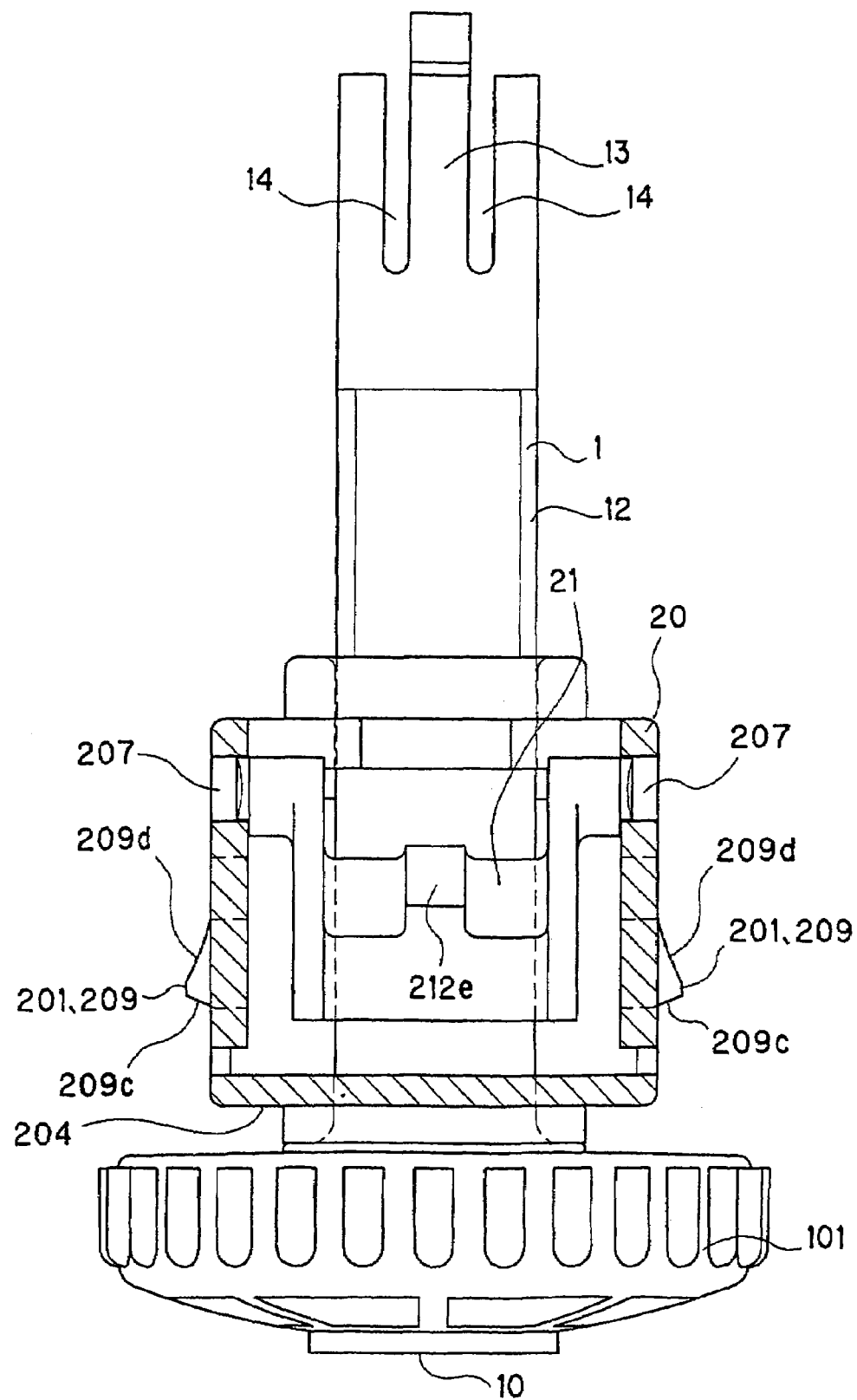
FIG. 3 is a side sectional view of the leg device (before attachment of release body 22)
Figure 4:
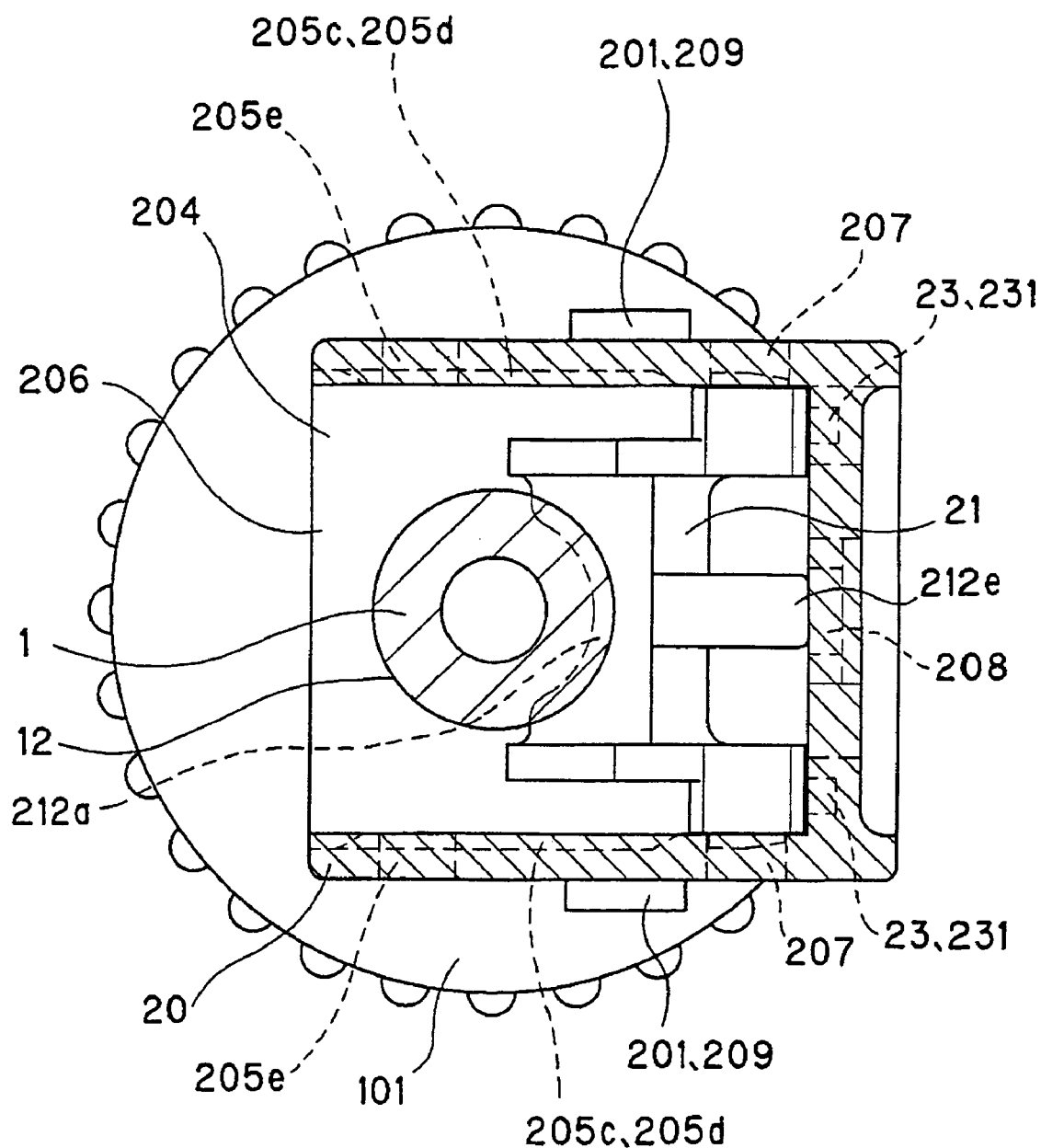
FIG. 4 is a plan sectional view of same.
Figure 5:
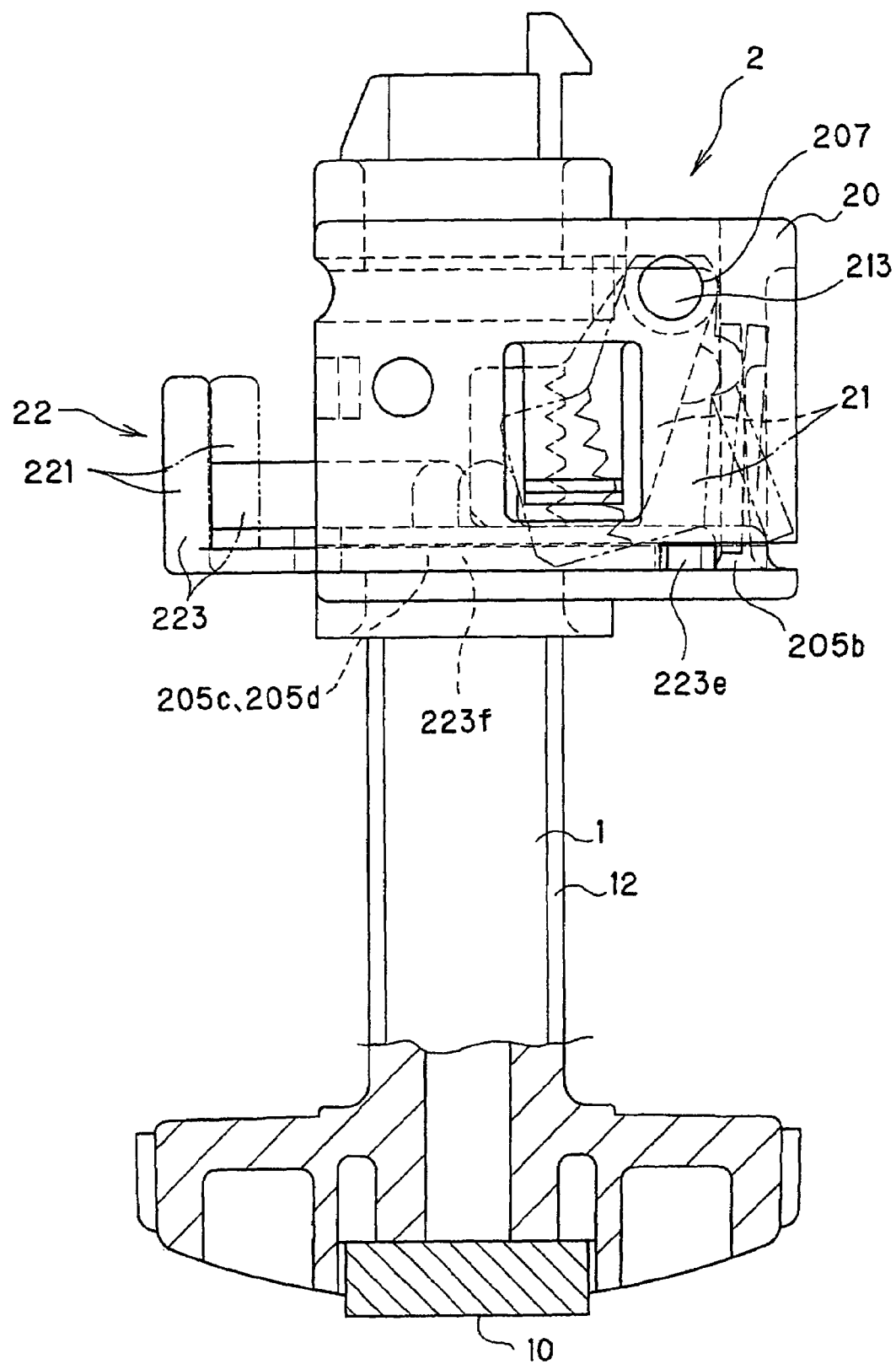
FIG. 5 is a side view of leg device (leg device having slider body 223)
Figure 6:
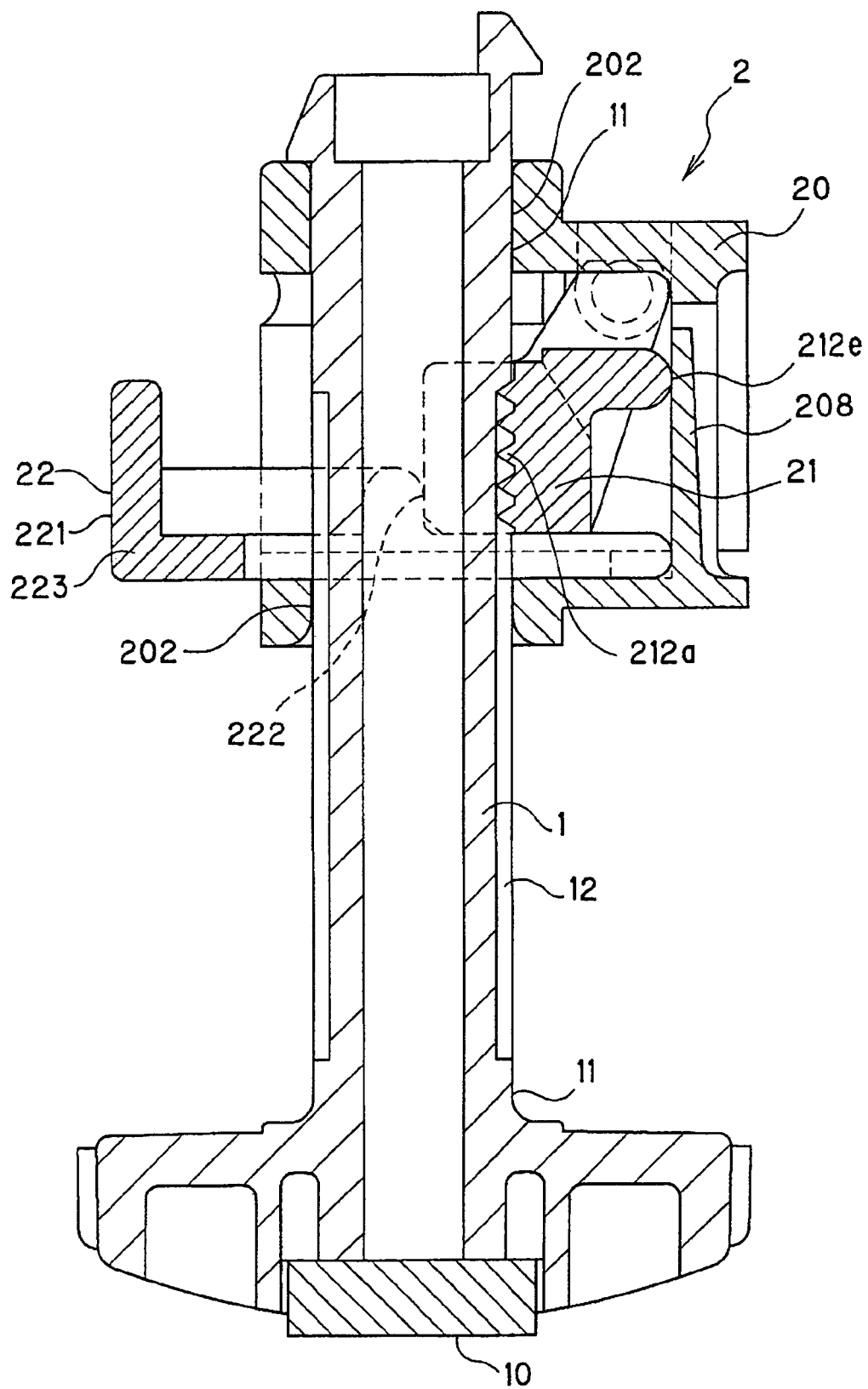
FIG. 6 is a side sectional view of same.
Figure 7:
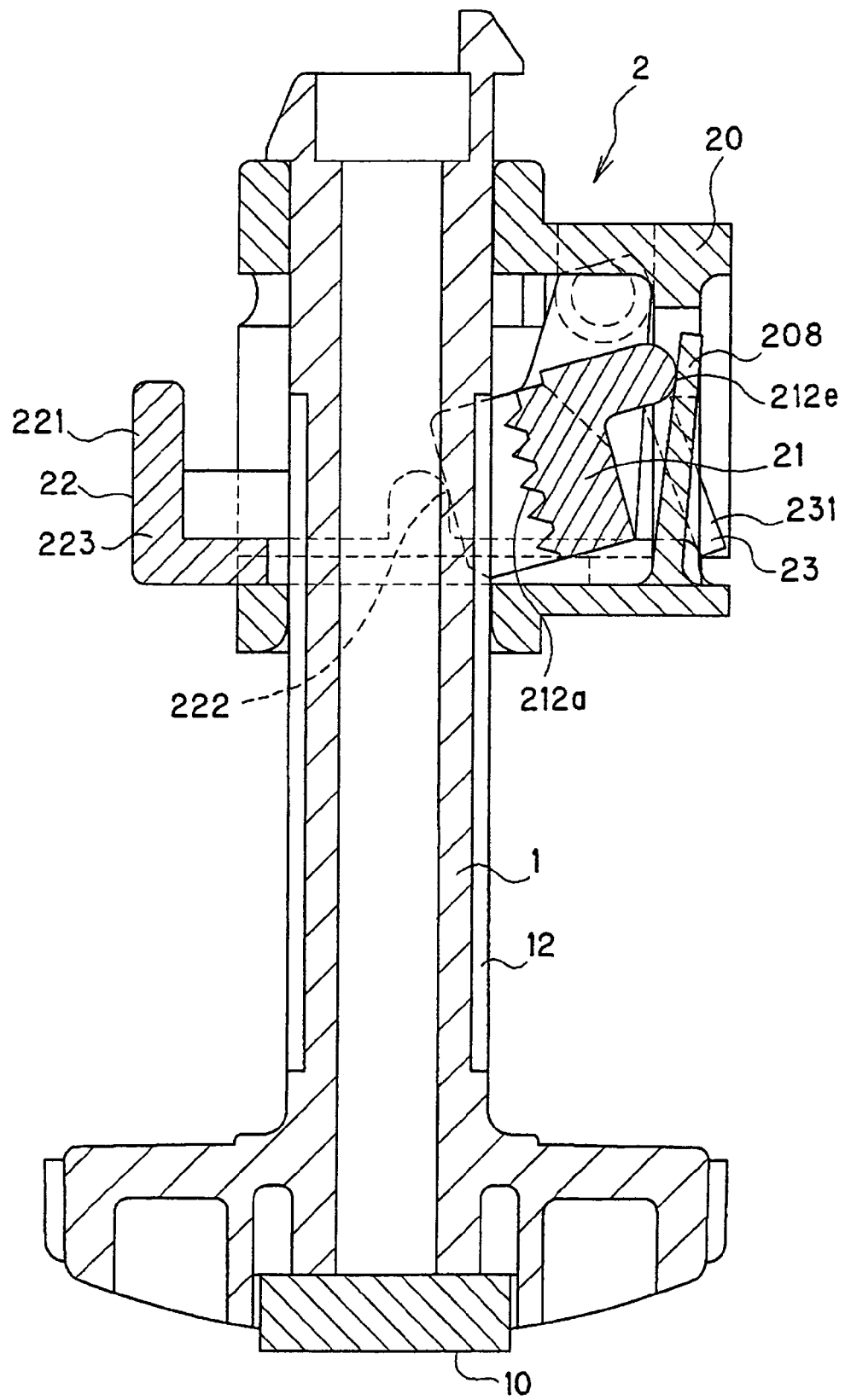
FIG. 7 is a side sectional view of same (release position of slider body 223)
Figure 8:
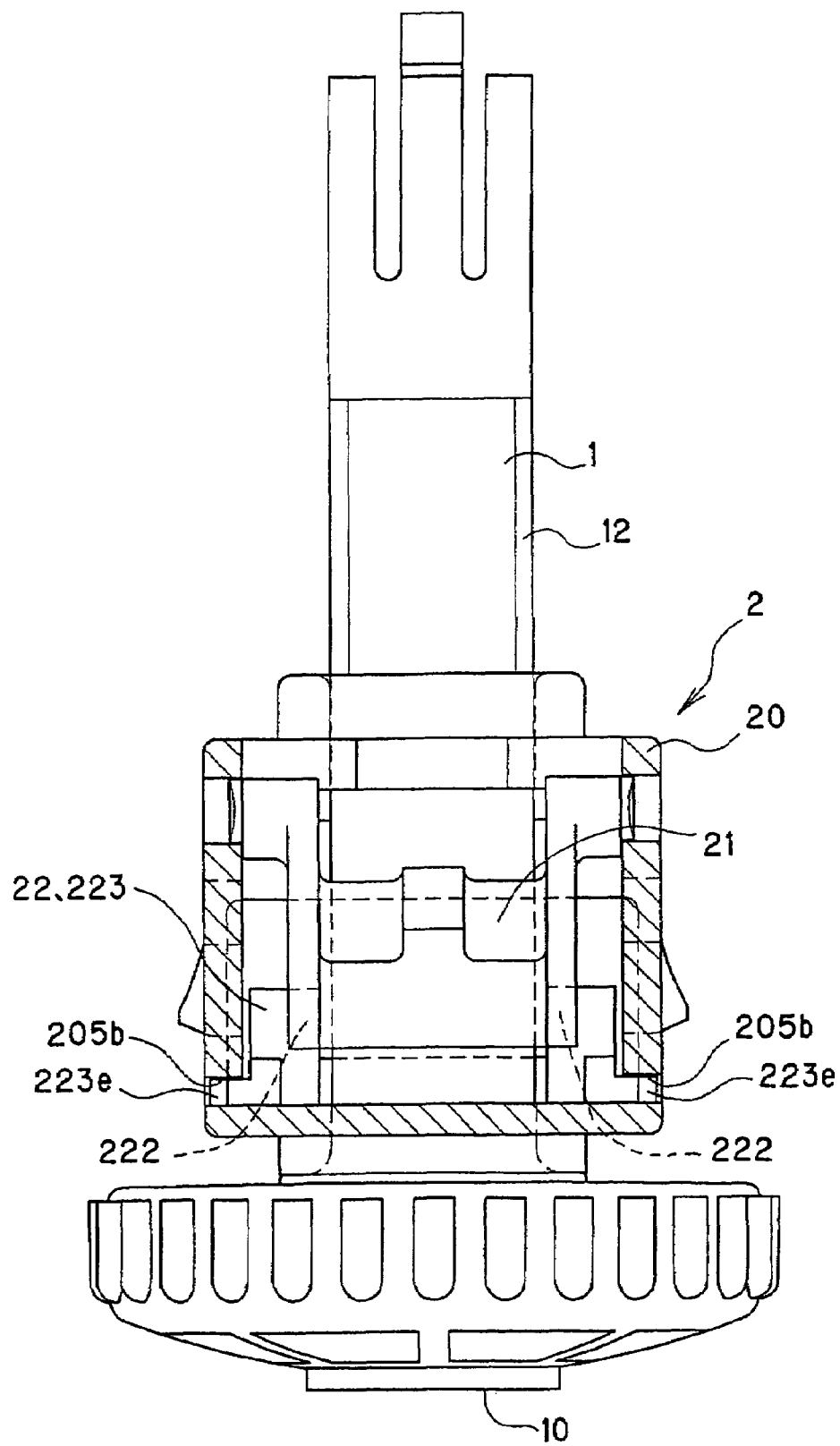
FIG. 8 is a side sectional view of same.
Figure 9:
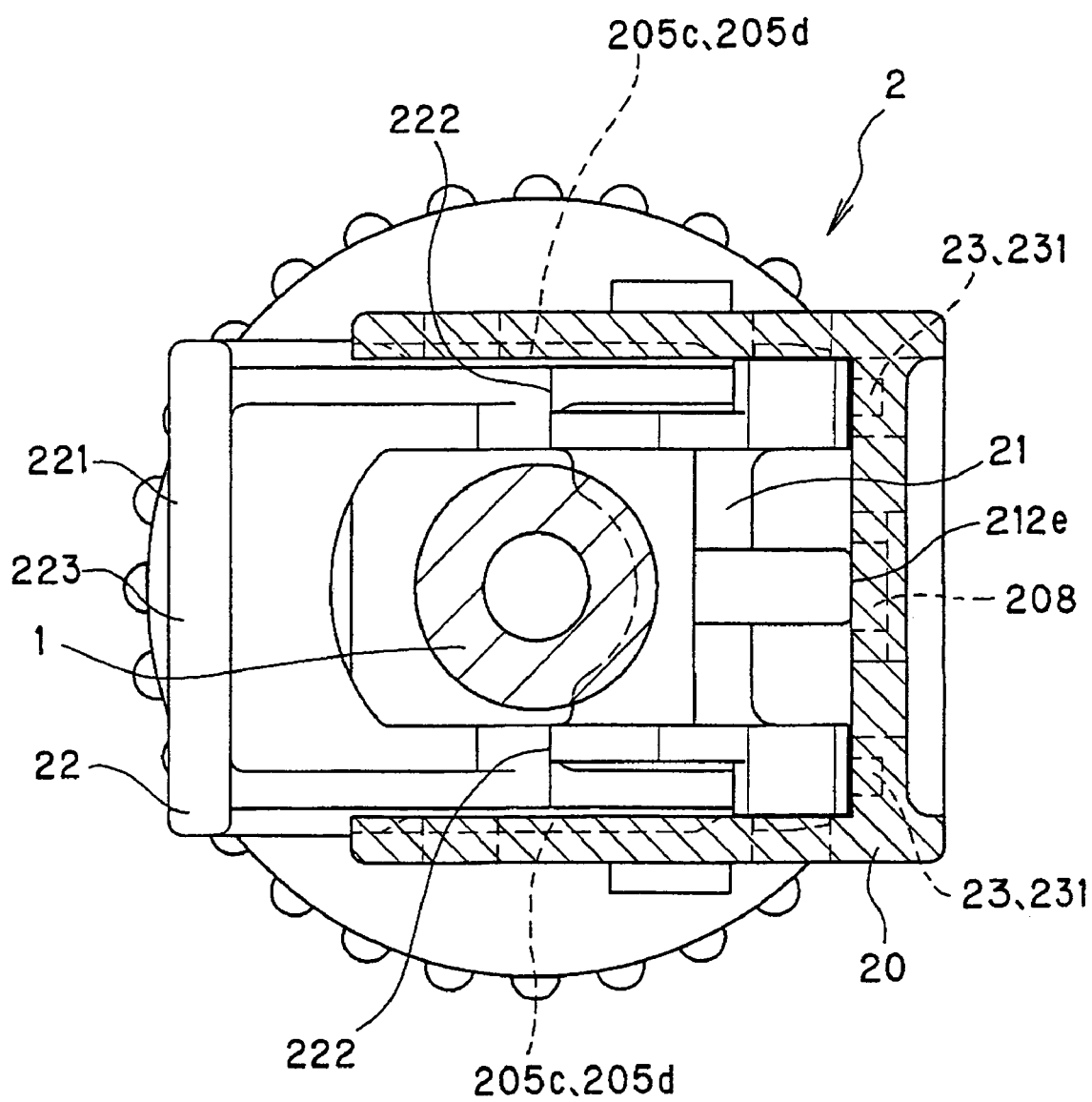
FIG. 9 is a plan sectional view of same.
Figure 13:
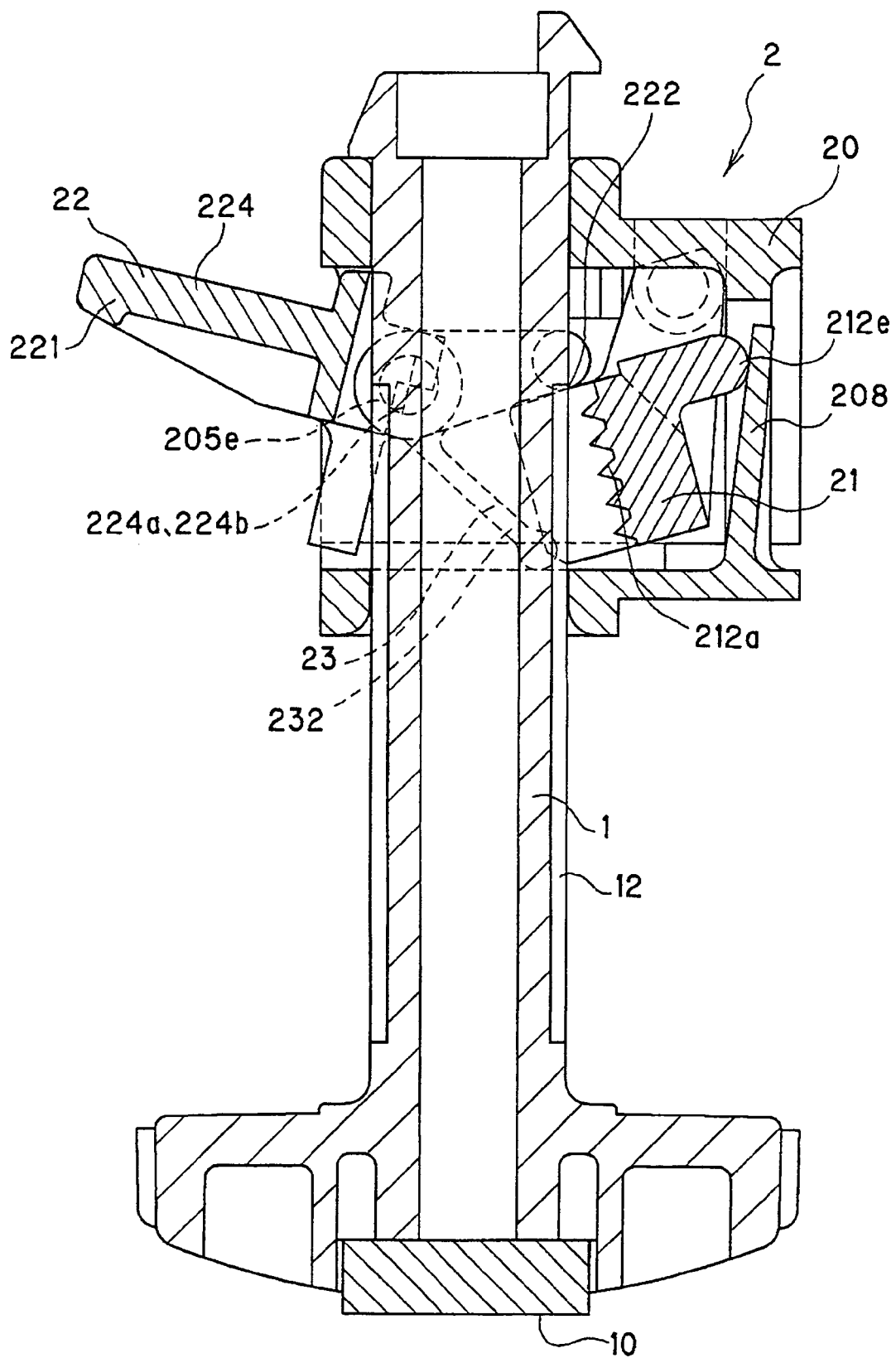
FIG. 13 is a side sectional view of same (release position of rotating body 224)
Figure 14:
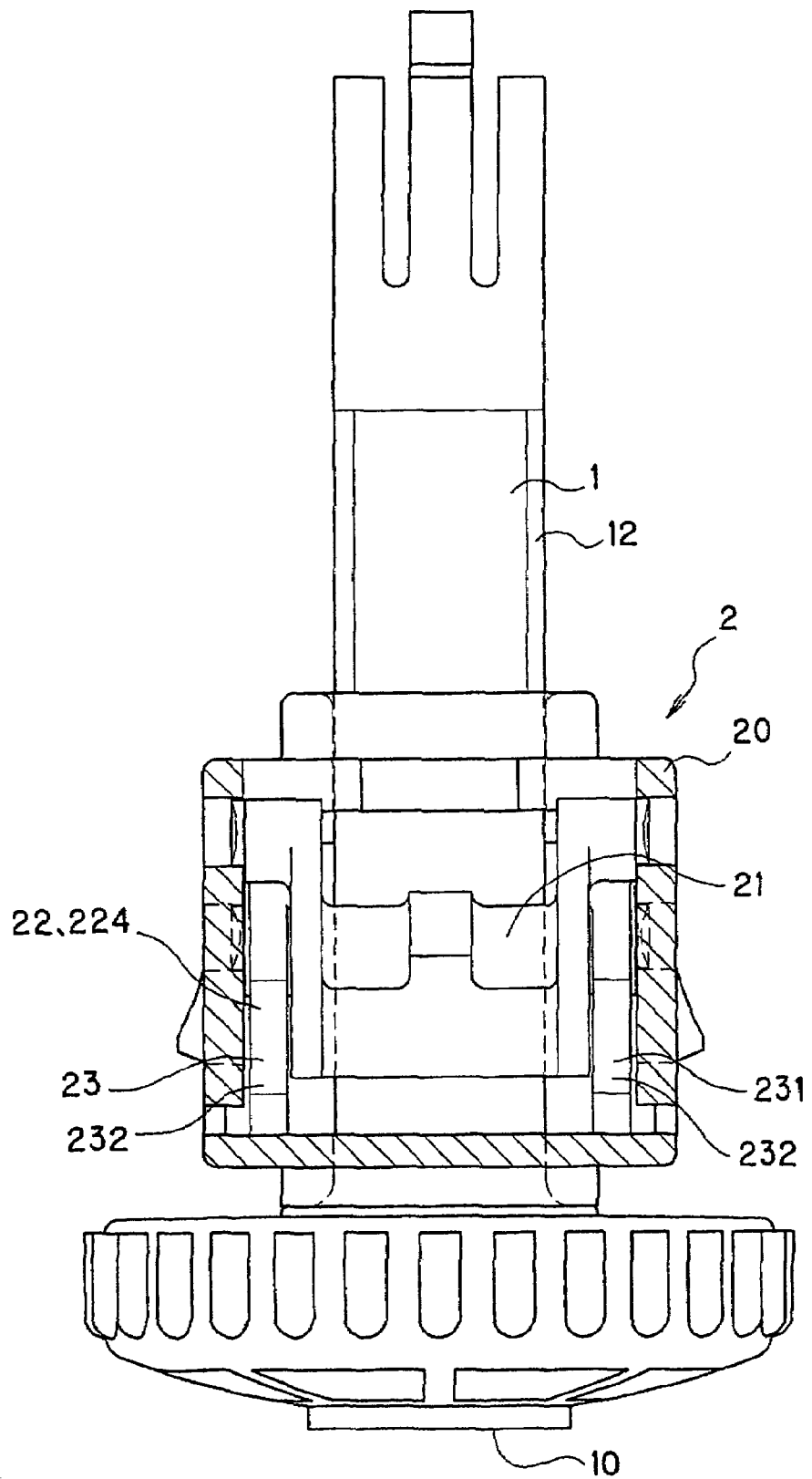
FIG. 14 is a side sectional view of same.
Figure 15:
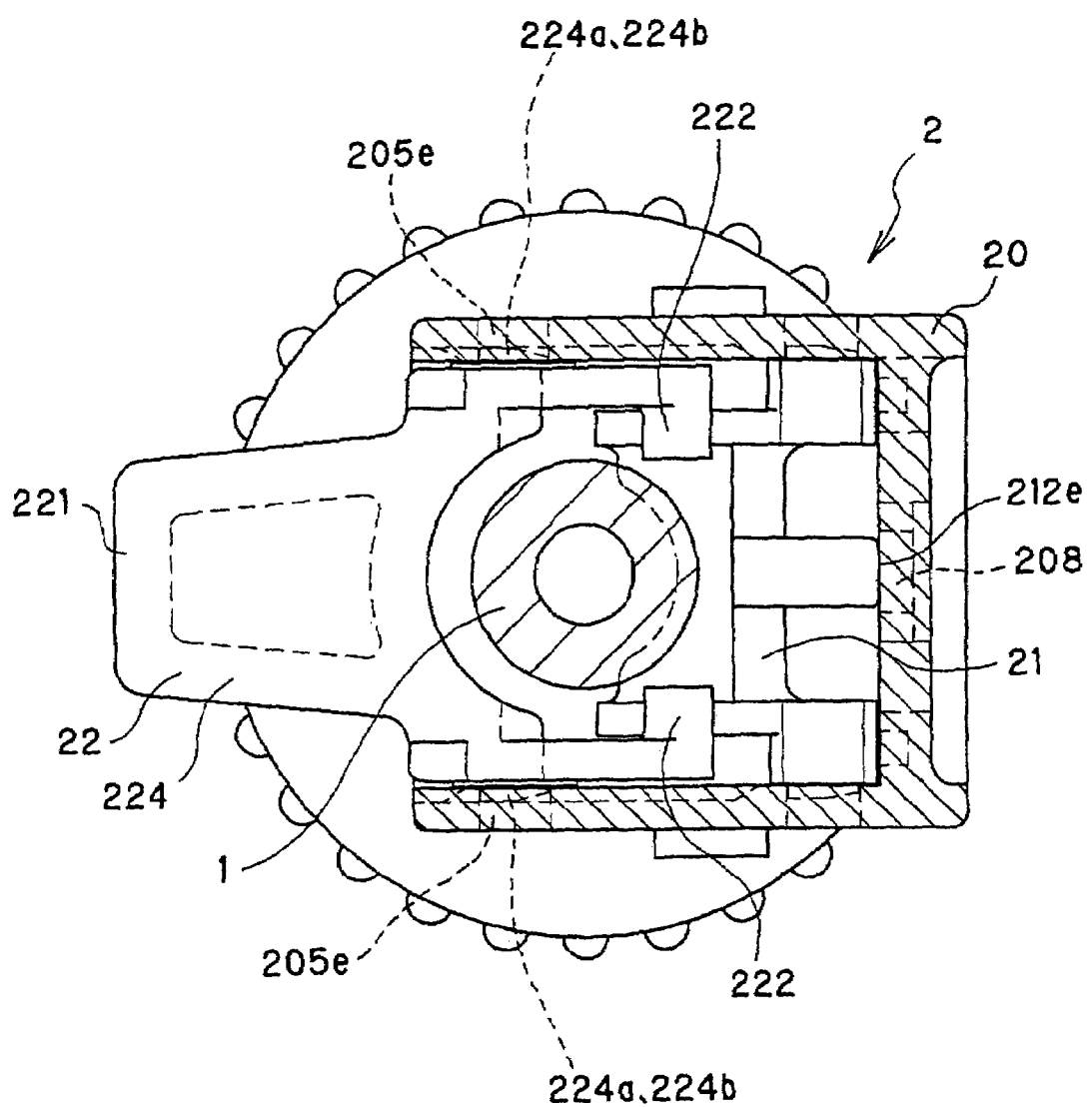
FIG. 15 is a plan sectional view of same.

In particular, FIG. 7 and FIG. 13 show a condition in which the release body 22 is moved to the release position and the lock body 21 is moved backward. Also, FIG. 2, FIG. 3, FIG. 8, and FIG. 14 show the state in which the ascending/descending body 2 is most descended.

The leg device pertaining to this embodiment is attached to various kinds of supported objects P to become a leg of these supported objects P, and also, it has a function (adjuster function) of supporting such supported objects P to be capable of height adjustment (level adjustment).

Concretely, such leg device can be used, for example, as legs of image projection devices such as so-called liquid crystal projectors, projectors, and slide projectors, or as a part of legs such as tripods, attached to the lower end parts of these legs. When this leg device is used in such an image projection device, it is provided on the lower part on the front side of this image projection device where the projection lens is provided, and is used for adjusting the angle of tilt of this image projection device, whereby it is used for adjusting the height position in which the image projected from this projection lens is projected on a screen, or the like.

Such leg device comprises a leg shaft 1 and an ascending/descending body 2.

The leg shaft 1 is constituted so as to have a male screw shape having a ground part 10 on the lower end part. In the illustrated example, such leg shaft 1 has a disk-shaped part 101 on the lower end part, and a cushion material 102 is provided on the underside of this disk-shaped part 101. Also, this cushion material 102 is set on a ground surface G such as a floor surface, earth surface or table surface, so as to have the supported object P supported on this ground surface G.

Also, in the illustrated example, such leg shaft 1 is constituted so as to have a screw-less part 11 respectively on the lower end part side and the upper end part side, and also to have a male screw part 12 between the screw-less parts 11. A female screw-shaped part 212*a* of a lock body 21 to be described later, which is a constituent of said ascending/descending body 2, is caused to be engaged with the male screw part 12 of this leg shaft 1, and this ascending/descending body 2 is raised or lowered by rotational operation of the leg shaft 1 performed by gripping said disk-shaped part 101.

Also, in the illustrated example, on the upper end part of the leg shaft 1, there is formed an elastic coupling piece 13, which once is elastically deformed accompanying insertion of this leg shaft 1 from beneath into a pass-through/slip-out hole 202 of a base 20, to be described later, of said ascending/descending body 2, and then springs back at a position having slipped out above this pass-through/slip-out hole 202 and is coupled to this pass-through/slip-out hole 202.

In the illustrated example, the leg shaft 1 is constituted as a hollow cylindrical form, and also the elastic coupling piece 13 is formed between two notches 14. By these notches 14, the coupling pieces 13 are opened outward on the notch ends and extend in the axial direction of the leg shaft 1 on the terminal end of this upper end part. Such elastic coupling piece 13 is formed on both sides in the diameter direction of the leg shaft 1. Also, in the illustrated example, one of the two elastic coupling pieces 13 is made so as to stick out further upward from the terminal end of the upper end part of the leg shaft 1. A projecting part 131 is formed on each of the outside end parts on the upper ends of the two elastic coupling pieces 13. This projecting part 131 has a coupling surface 132 which faces the lower end part side of the leg shaft 1, and also it has an inclined surface 134 on the upper side sandwiching a tip part 133, which is inclined in a direction in which the amount of projection of the projecting part 131 is made gradually larger as it goes toward this tip part 133.

Also, the measurement between the tip parts 133 of the projecting parts 131 of the two coupling pieces 13 is made to become somewhat larger than the hole diameter of the pass-through/slip-out hole 202 of the ascending/descending body 2. When the ascending/descending body 2 and the leg shaft 1 are combined by inserting this leg shaft 1 into the pass-through/slip-out hole 202, the elastic coupling piece 13 is elastically deformed smoothly by striking the inclined surface 134 of the projecting part 131 against the hole opening edge of the pass-through/slip-out hole 202, and it elastically returns at the position where it comes out above this pass-through/slip-out hole 202 whereby the coupling surface 132 is coupled to the pass-through/slip-out hole 202.

By this, in the illustrated example, the left shaft 1 does not unexpectedly slip and fall from the pass-through/slip-out hole 202 of the ascending/descending body 2 upon lifting up a supported object P attached to the ascending/descending body 2.

Also, in the illustrated example, because one of the two elastic coupling pieces 13 extends longer further up from the other and the positions of the tip parts 133 of the projecting parts 131 of the two elastic coupling pieces 13 are vertically different, during insertion of the leg shaft 1 into the pass-through/slip-out hole 202, this insertion can be performed without both of the two elastic coupling pieces 13 simultaneously being elastically deformed inward to the maximum extent, so that this insertion can be performed easily. In addition to that, in the illustrated example, the female screw-shaped part 212*a* of the lock body 21 is engaged with the male screw part 12 of the leg shaft 1 in the position where the hole opening above the pass-through/slip-out hole 202 of the ascending/descending body 2 is struck by the coupling surface 132 of the projecting part 131 of the other elastic coupling piece 13 (shorter one) of the two elastic coupling pieces 13. In addition, it is made such that when the ascending/descending body 2 is raised beyond this by rotational operation of the leg shaft 1 and the female screw-shaped part 212*a* of the lock body 21 is located in the position of formation of the screw-less part 11, the hole opening above the pass-through/slip-out hole 202 of the ascending/descending body 2 is struck by the coupling surface 132 of the projecting part 131 of one elastic coupling piece 13 (longer one) of the two elastic coupling pieces 13. Thus, slipping-out of the leg shaft 1 from the ascending/descending body 2 in the position where the ascending/descending body 2 was fully raised can be prevented assuredly.

On the outer perimeter surface of the disk-shaped part 101 constituting the leg shaft 1, plural ribs 103 following the thickness direction of this disk-shaped part 101 are provided with an interval between adjacent ribs 103 in the circular direction, so that the leg shaft 1 can be rotationally operated more easily such as by gripping this disk-shaped part 101.

The amount of projection of such leg shaft 1 from the upper side of the ascending/descending body 2 is made larger as this ascending/descending body 2 is lowered. Typically, a receiving space Pa for the leg shaft 1, which continues on the pass-through/slip-out hole 202 of the ascending/descending body 2 and in which the leg shaft 1 thus projecting is received, is formed in the place of attachment of the ascending/descending body 2 on the supported object P.

Meanwhile, the ascending/descending body 2 is made so as to be supported while ascending and descending on the leg shaft 1. Also, this ascending/descending body 2 has a base 20, a lock body 21, and a release body 22.

The base 20 has a fixing part 201 to a supported object P, and also it has a pass-through/slip-out hole 202 for the leg shaft 1. In the illustrated example, such base 20 is constituted as a box shape, having an upper plate part 203 and a lower plate part 204 with square plate-shaped, and having side plate parts 205 respectively between three edge parts of this upper plate part 203 and three edge parts of the lower plate part 204, and having one side part as an open part 206. Also, in the illustrated example, the pass-through/slip-out hole 202 for the leg shaft 1 is formed respectively in a position toward the side of formation of the open part 206 on the upper plate part 203 and a position toward the side of the open part 206 on the lower plate part 204.

The lock body 21 has the upper end part (in the illustrated example, the upper end part of a plate-shaped arm part 211 to be described later) assembled onto the base 20 to be capable of rotation, and also has a female screw-shaped part 212*a* which engages with the male screw part 12 of the leg shaft 1 on the front face side of the lower end part (in the illustrated example, the front face 212*c* of a block part 212 to be described later).

In the illustrated example, such lock body 21 integrally has a pair of plate-shaped arms 211, which has a plate surface disposed in the vertical direction, consisting of a horizontal plate part 211*a* and tilted-up plate part 211*b* extending diagonally upward from the upper part of the rear side of this horizontal plate part 211*a*; and a block part 212, which is formed so as to straddle between the horizontal plate parts 211*a* of this pair of plate-shaped arm parts 211.

The front face of the block part 212 is made to be positioned somewhat to the rear more so than the front end of the horizontal plate part 211*a* of the plate-shaped arm part 211. Also, the female screw-shaped part 212*a* is formed on the front face 212*c* of this block part 212. Although such female screw-shaped part 212*a* can be constituted by forming one line or plural lines of projections for engaging with the male screw part 12 of the leg shaft 1 on the front face 212*c* of the block part 212, in the illustrated example, such female screw-shaped part 212a is constituted by forming a virtual female screw part 212b having a shape which engages with the male screw part 12 of the leg shaft 1 on the front face 212c of said block part 212.

Also, a contact projection 212e which sticks out toward the rear is formed in about a middle position on the upper edge part on the back face 212d of the block part 212. Also, it is made such that this contact projection 212e contacts an elastic piece 208 to be described later which is formed on a side plate part 205 on the base 20 in a position opposite the open part 206. (Below, the side plate part 205 on which this elastic piece 208 is provided, of the three side plate parts 205 of the base 20, is called the back-side side plate part 205a.)

Also, on the outer surface of the upper end of the tilted-up plate part 211b of the pair of plate-shaped arm parts 211, there is formed a leg shaft 213, which consists of a thick-diameter columnar body 213a projecting out to the side from this outer surface, and a thin-diameter columnar body 213b which projects out further to the side from the projecting end face of this thick-diameter columnar body 213a. The pitch between the projecting end faces of the thin-diameter columnar bodies 213b of the pair of plate-shaped arm parts 211 is made to become somewhat larger than the pitch between the inner faces of the two side plate parts 205 adjacent to the back-side side plate part 205a of the base 20.

Also, in the illustrated example, by inserting the lock body 21 through the open part 206, with the back face of this lock body 21, that is, the back face 212d side of the block part 212, first, into shaft holes 207 provided in a state respectively piercing through upper corner parts of the rear parts of the two side plate parts 205, adjacent to the back-side side plate part 205a of the base 20, after the projecting end faces of the thin-diameter columnar bodies 213b are caused to be pushed against the inner surfaces of these side plate parts 205. Thus, the tilted-up plate parts 211b of the pair of plate-shaped arms once are caused to be bent inward elastically in the direction of somewhat narrowing the pitch between these tilted-up plate parts 211b, by springing-back in the inserted position of the lock body 21 where these thin-diameter columnar bodies 213b are inserted into said shaft holes 207, the thin-diameter columnar bodies 213b are caused to be inserted into the shaft holes 207, whereby it is made such that the upper end part of the lock body 21 is assembled to be capable of rotation on the base 20.

Also, on the base 20, there is integrally provided an elastic piece 208, which contacts the side of the back face of the lock body 21, that is, the back face 212d of the block part 212, so as to push the female screw-shaped part 212a of the lock body 21 thus combined to be capable of rotation onto the base 20 against the outer perimeter surface of the leg shaft 1 inserted through the pass-through/slip-out hole 202.

In the illustrated example, such elastic piece 208 is constituted by a part of the back-side side plate part 205a partitioned by a pair of vertical notches 208a extending in the vertical direction and a horizontal notch 208b straddling between the notch upper ends of this pair of vertical notches 208a in a position in about the middle in the left-right direction of such back-side side plate part 205a. Also, in the illustrated example, the inner surface on the upper end side of this elastic piece 208 is regularly in contact with the base 20 contact projection 212e of the lock body 21.

Concretely, the female screw-shaped part 212a of the lock body 21 is positioned on the outer perimeter surface position of the leg shaft 1 by the contact between such elastic piece 208 and the contact projection 212e.

By this, the supported object P can be supported to be capable of height adjustment. That is, a leg device can be constituted, in which by inserting the leg shaft 1 into the pass-through/slip-out hole 202 of the ascending/descending body 2 while causing the lock body 21 to move backward causing the elastic piece 208 to be elastically deformed outward, the lock body 21 is pushed back forward by the elastic return of the elastic piece 208 after this insertion. Thus, the female screw-shaped part 212a of this lock body 21 is pushed against and caused to be engaged with the male screw part 12 of the inserted leg shaft 1. In the leg device attached by the fixing part 201 of the base 20 to the supported object P, the measurement between the underside of the ascending/descending body 2 and the ground part 10 of the leg shaft 1 is changed by rotationally operating the leg shaft 1, whereby it is made capable of micro-adjustment of the height of the supported object P.

That is, the ascending/descending body 2 has the female screw-shaped part 212a of the lock body 21 engaging the male screw part 12 of the leg shaft 1, and when the leg shaft 1 is rotated, the female screw-shaped part 212a is so-to-say relatively screwed forward or screwed backward along the leg shaft 1, whereby the height of the supported object P can be changed little by little. In the case that the leg shaft 1 is further rotationally operated by accident in the fully descended position of the ascending/descending body 2 and the fully ascended position of the ascending/descending body 2, in order not to cause damage to the female screw-shaped part 212a by this rotational operation, it can be made to rotate so as to cause the lower end part of the lock body 21 to move in the backward center on the position of rotational assembly with the base 20 while causing the elastic piece 208 to be bent outward.

Also, in this embodiment, a release body 22 is made on the base 20. The release body 22 has an operating part 221 to stick outward from the side of this base 20 and a striking part 222 which is positioned inside the base 20, and also is moved by a release operation using this operating part 221 to a release position in which the striking part 222 is caused to strike the lock body 21 so as to cause the lower end part of this lock body 21 to move backward in opposition to the pushing of the elastic piece 208.

In the illustrated example, the operating part 221 of the release body 22 is made to stick outward from the open part 206 on the base 20.

By this, in this embodiment, the locked state of the lock body 21, in which the female screw-shaped part 212a is caused to be engaged with the male screw part 12 of the leg shaft 1 by the pushing of the elastic piece 208, can be released with one touch by moving the lower end part of this lock body 21 by operating the release body 22 to move to the release position. Also, by this release, adjustment in which the amount that the leg shaft 1 sticks out from the underside of the ascending/descending body 2 is increased or decreased, that is, adjustment in which the height of the supported object P is made changeable, can be performed within a great range.

Also, the leg device pertaining to this embodiment has a push-back means 23 for this release body 22, which allows movement of the release body 22 to the release position by release operation of such release body 22 while being elastically deformed by this movement.

By this, in this embodiment, when the release operation of the release body 22 is stopped, the release body 22 which was moved to the release position can be returned quickly to the position before this movement by the elastic return of such push-back means 23. Also, by the return of this release body 22, the lower end part of the lock body 21 is moved forward-again by the elastic piece 208 whereby the female-screw-shaped part 212a of this lock body 21 can be caused to be engaged with the male screw part 12 of the leg shaft 1. That is, the supported body P can be positioned quickly and stably at a desired height by performing adjustment in which the height of the supported object P is made changeable within a great range by the release operation of the release body 22, and then stopping this release operation at the position where this height has becomes the desired height.

FIG. 5-FIG. 9 show an example in which the release body 22 is moved to slide whereby the lower end part of the lock body 21 is caused to move backward.

In this example, the lock body 21 is made so as to push its lower end part against the leg shaft 1 from one side sandwiching this leg shaft 1 inside the base 20; and the release body 22 is constituted as a slider body 223, which is combined on the base 20 to be capable of sliding movement from the other side sandwiching this leg shaft 1 toward the one side and causes its striking part 222 to strike the lock body 21 in the release position.

In this example, such slider body 223 has:

(1) a base plate 223a, which is made to contact on the underside with the top side of the lower plate part 204 of the base 20;

(2) a plate-shaped operating part 221, which sticks out upward from the outer edge part, and sticks outward from the open part of the base 20, on this base plate 223a; and (3) arm parts 223d, which stick out forward from this base plate 223a on both sides sandwiching a pass-through part 223c for the leg shaft 1 which is formed so as to bite in toward the outer edge part of the base plate 223a from the side opposite this outer edge part.

Also, in this example, it is made such that the top sides of rib-shaped uplifted parts 223b formed on both sides left and right of the base plate 223a are positioned upward more than the top sides of these arm parts 223d, and step surface-shaped striking parts 222 which face forward are formed above the base parts of the arm parts 223d. Also, in this example, it is made such that by pushing-in operation of the operating part 221 of the slider body 223, the slider body 223 is moved forward to the release position inside the base 20, and in this release position, the striking parts 222 of the slider body 223 are struck against the front ends of the horizontal plate parts 211a of the plate-shaped arm parts 211 in the lock body 21 in which the female screw-shaped part 212a was caused to be engaged with the male screw part 12 of the leg shaft 1. The pitch between the inner surfaces of the pair of arm parts 223d becomes somewhat larger than the pitch between the outer surfaces of the horizontal plate parts 211a of the pair of plate-shaped arm parts 211 constituting the lock body 21.

Also, in this example, coupling claws 223e which stick outward are provided respectively on the front end parts of the pair of arm parts 223d of the slider body 223. The pitch between the coupling claws 223e of this pair of arms 223d becomes somewhat larger than the pitch between the two side plate parts 205 of the base 20. On the other hand, slot-shaped windows 205b which extend long following the front-back direction (left-right direction in FIG. 5) of the base 20 are formed on the lower parts of the side plate parts 205 of the base 20 on the side where this side plate parts 205 contact with the back-side side plate part 205a. Also, in this example, by inserting the slider body 223 inside the base 20 from the open part 206 of this base 20 with the side of the arm parts 223d of the slider body 223 first, the pair of arm parts 223d of the slider body 223 once are caused to be bent inward, and in addition, when the base 20 is inserted into the position where the coupling claws 223e of these arm parts 223d enter into the slot-shaped windows 205b, the bent-in pair of arm parts 223d elastically return and these coupling claws 223e are let into the slot-shaped windows 205b, and the slider body 223 comes to be assembled onto this base 20 in a state being capable of sliding movement in the front-back direction of the base 20 within a range in the amount of the length measurement of these slot-shaped windows 205b.

Also, in this example, on each of the two sides sandwiching the elastic piece 208 on the back-side side plate part 205a on the base 20, there is formed a push-back piece 231, which is formed by a part of this back-side side plate part 205a partitioned by a pair of vertical notches 231a and a horizontal notch 231b straddling between the notch lower ends of this pair of vertical notches 231a. Also, it is made such that accompanying the movement of the slider body 223 to the release position, the front ends of the arm parts 223d of this slider body 223 push these push-back pieces 231 whereby these push-back pieces 231 are caused to be elastically deformed outward. That is, in this example, these push-back pieces 231 function as the push-back means 23 of the release body 22.

Also, in this example, ribs 223f which extend in the front-back direction are formed on both side parts of the left and right of the base plate 223a of the slider body 223 and on the outer surface parts of the arm parts 223d, and in addition, guide grooves 205d for receiving these ribs 223f are formed respectively on the lower parts of the inner surfaces of both side plate parts 205 of the base 20. The slider body 223 is made such that the sliding movement is guided by these guide grooves 205d. That is, in this example, it is made such that such guide grooves 205d function as a guide part 205c to be described later.

By this, in the example shown in FIG. 5-FIG. 9, the lock body 21 can be moved backward with one touch by using the operating part 221 to cause the slider body 223 to move sliding from the other side sandwiching the leg shaft 1 toward the one side, whereby the engagement between the female screw-shaped part 212a of the lock body 21 and the male screw part 12 of the leg shaft 1 is released, and changing of the height of the supported object P within a great range can be performed.

FIG. 11-FIG. 15 show an example in which the release body 22 is rotated whereby the lower end part of the lock body 21 is caused to move backward.

In this example, the release body 22 is constituted as a rotating body 224, which is combined on the base 20 to be capable of rotating by means of a rotating shaft 224a, and has an operating part 221 on one side sandwiching this rotating shaft 224a and a striking part 222 on the other side, and causes its striking part 222 to strike the lock body 21 from above in the release position by a release operation of lifting up the operating part 221.

In this example, such rotating body 224 has:

(1) a base plate 224c which has the plate surface oriented vertically;

(2) an operating part 221 which extends from the outer surface of the base plate 224c so as to stick outward from the open part 206 of the base 20; and (3) arm parts 224d which stick out forward from the inner surfaces of the base plate 224c respectively on both sides left and right of this base plate 224c.

In this example, it is made such that the space between the pair of arm parts 224d of the rotating body 224 becomes a pass-through part 224e for the leg shaft 1. Also, in this example, shaft projections 224b, which become rotating shafts 224a to be rotationally inserted inside shaft bearing holes 205e formed respectively on both side plate parts 205 of the base 20, are formed respectively on the outer surfaces parts of the base parts of the pair of arm parts 224*d*. These shaft bearing holes 205*e* are formed on both side plate parts 205 of the base 20 on the other side sandwiching the leg shaft 1 of this base 20. In this example, the pitch between the front ends of the shaft projections 224*b* of the pair of arm parts 224*d* is somewhat larger than the pitch between the inner surfaces of the two side plate parts 205 of the base 20, and by elastic returning of these shaft projections 224*b* at the position where they enter into the shaft bearing holes 205*e* after elastic deformation of both or either one of the rotating body 224 and the base 20 accompanying insertion of the rotating body 224 inside the base 20 from the open part 206 of this base 20 with the side of the arm parts 224*d* of the rotating body 224 first, the shaft projections 224*b* enter into these shaft bearing holes 205*e* to be capable of rotation, whereby the rotating body 224 comes to be assembled onto the base 20 to be capable of rotation.

Also, in this example, striking parts 222 having a projecting shape which projects out toward the sides of the respective other arm parts 224*d* are formed respectively on the front end parts of this pair of arm parts 224*d*. Also, in this example, by an operation of lifting up the operating part 221 of the rotating body 224, the arm parts 224*d* of the rotating body 224 are pushed downward, that is, to the release position, inside the base 20, such that the striking parts 222 of the arm parts 224*d* thus pushed down are struck against the upper ends of the horizontal plate parts 211*a* of the plate-shaped arm parts 211 on the lock body 21 in which the female screw-shaped part 212*a* was caused to be engaged with the male screw part 12 of the leg shaft 1. The pitch between the inner surfaces of the pair of arm parts 224*d* becomes somewhat larger than the pitch between the outer surfaces of the horizontal plate parts 211*a* of the plate-shaped arm parts 211 constituting the lock body 21.

Also, in this example, on each of the pair of arm parts 224*d* of the rotating body-224, there is formed a push-back piece 232, which has the upper end of the piece integrally connected to the lower part on the base part side of the arm part 224*d* and sticks out diagonally downward so as to gradually move away from the inner surface of the base plate 224*c* as it goes toward the lower end of the piece. Also, in this example, it is made such that accompanying causing rotation of the rotating body 224 toward the release position, this push-back piece 232, whose lower end of the piece has been struck against the top side of the lower plate part 204 of the base 20, is elastically deformed so that the front side becomes the inside of the bend. That is, in this example, these push-back pieces 232 function as the push-back means 23 of the release body 22.

By this, in the example shown in FIG. 11-FIG. 15, the lock body 21 can be moved backward with one touch by causing rotational operation of the rotating body 224, in which the operating part 221 is lifted upward and consequently the striking part 222 is pushed downward, whereby the engagement between the female screw-shaped part 212*a* of the lock body 21 and the male screw part 12 of the leg shaft 1 is released, and changing of the height of the supported object P within a great range can be performed.

Also, in this embodiment, this base 20 has respectively:

a guide part 205*c*, which guides the sliding movement of a release body 22 that is constituted as a slider body 223, which is combined on the base 20 to be capable of sliding movement from the other side sandwiching the leg shaft 1 toward the one side and causes its striking part 222 to strike the lock body 21 in the release position; and a shaft bearing hole 205*e* for the rotating shaft 224*a* of a release body 22 that is constituted as a rotating body 224, which is combined on such base 20 to be capable of rotating by means of a rotating shaft 224*a*, and has an operating part 221 on one side sandwiching this rotating shaft 224*a* and a striking part 222 on the other side, and causes its striking part 222 to strike the lock body 21 from above in the release position by a release operation of lifting up the operating part 221.

Concretely, in the illustrated example, a guide groove 205*d* to become the guide part 205*c*, the slot-shaped window 205*b*, and the shaft bearing hole 205*e* are provided on both side plate parts 205 of the base 20, and in addition, the push-back piece 232 is provided on the back-side side plate part 205*a* of this base 20.

By this, in this embodiment, a leg device can be constituted, in which the release body 22 is made as a slider body 223, by assembling the slider body 223 on such base 20, and in addition, a leg device also can be constituted, in which the release body 22 is made as a rotating body 224, by assembling the rotating body 224 on such base 20. That is, two kinds of leg devices having different constitutions of the release body 22 can be suitably constituted respectively while using the base 20 as a common part.

Also, in this embodiment, it is made such that the base 20 is combined onto the supported object P, between a pair of attachment plate parts Pb, formed on this supported object P, in a manner such that one of the two side plate parts 205 adjacent to the back-side side plate 205*a* is made to contact with one of this pair of attachment plate parts Pb, and the other of these two side plate parts 205 is made to contact with the other of this pair of attachment plate parts Pb, and in addition, the fixing parts 201 are formed respectively on this pair of side plate parts 205. Also, these fixing parts 201 are taken as the coupling projections 209, which enter into window holes Pc, the window holes Pc being opened in the attachment plate parts Pb, by springing back after once being elastically deformed by being struck against the inner surfaces of the attachment plate parts Pb accompanying insertion of the base 20 between the pair of attachment plate parts Pb.

In the illustrated example, a box-shaped bracket part Pd which has a square cylinder shape opened on the bottom surface is formed on the supported object P. A run-through hole Pe is formed on the upper part of this bracket part Pd, and it is made such that the leg shaft 11 of the leg device, which is attached by inserting the base 20 into this bracket part Pd from beneath, comes out upward from this run-through hole Pe. Also, the window holes Pc are formed respectively on a pair of side plate parts which are in opposite positions in this bracket part Pd, and it is made such that these side plate parts function as the attachment plate parts Pb.

Also, in the illustrated example, the coupling projection 209 is formed in a position in about the middle in the left-right direction of the side plate part 205 adjacent to the back-side side plate part 205*a* on the base 20, on the outer surface of a part of such side plate part 205 partitioned by a pair of vertical notches 209*a* and a horizontal notch 209*b* straddling between the notch lower ends of this pair of vertical notches 209*a*. Also, such coupling projection 209 has a coupling surface 209*c* which faces downward, and in addition, the upper surface sandwiching the tip part is made as an inclined surface 209*d* which gradually widens outward as it goes toward this tip part.

As a result, in the illustrated example, by inserting the base 20 from beneath between the pair of attachment plate parts Pb of the supported object P, that is, in the bracket part Pd, the coupling projections 209 of the base 20 couples in the window hole Pc of these attachment plate parts Pb, whereby the leg device can be provided on such supported object P with one touch.

The disclosure of Japanese Patent Application No. 2004-249940 filed on Aug. 30, 2004 is incorporated herein.

While the invention has been explained with reference to the specific embodiments of the invention, the explanation is illustrative and the invention is limited only by the appended claims.

What is claimed is:

1. A leg device for height-adjustably supporting an object, comprising:
   a leg shaft having a male thread portion, and a ground part on a lower end thereof, and
   an ascending/descending device supported on the leg shaft to be capable of ascending and descending, said ascending/descending device comprising:
   a base having a fixing part to be fixed to the object, a through hole for receiving the leg shaft therein, and an elastic piece;
   a lock body having an upper part pivotally assembled with the base, and a female screw part engageable with the male thread portion on a front side of a lower end part thereof, said lock body being pushed by the elastic piece to move the female screw part toward the leg shaft inserted into the through hole; and
   a release body having an operating part projecting outward from the base, and a striking part positioned inside the base, said release body being moved by a release operation of the operating part to a release position so that the striking part is moved to push the lower end part of the lock body backward in opposition to pushing of the elastic piece,
   wherein said release body is formed as a rotating body, and is rotatably assembled on the base through a rotating shaft, said release body having said operating part on one side of the rotating shaft and said striking part on the other side, to allow the striking part to push the lock body from above in the release position by the release operation of lifting up the operating part.

2. A leg device for height-adjustably supporting an object, comprising:
   a leg shaft having a male thread portion, and a ground part on a lower end thereof, and
   an ascending/descending device supported on the leg shaft to be capable of ascending and descending, said ascending/descending device comprising:
   a base having a fixing part to be fixed to the object, a through hole for receiving the leg shaft therein, and an elastic piece;
   a lock body having an upper part pivotally assembled with the base, and a female screw part engageable with the male thread portion on a front side of a lower end part thereof, said lock body being pushed by the elastic piece to move the female screw part toward the leg shaft inserted into the through hole; and
   a release body having an operating part projecting outward from the base, and a striking part positioned inside the base, said release body being moved by a release operation of the operating part to a release position so that the striking part is moved to push the lower end part of the lock body backward in opposition to pushing of the elastic piece,
   wherein said lower end part of the lock body is pushed against the leg shaft from one side of the leg shaft inside the base; said release body includes first and second release bodies; said base has a guide part for guiding a sliding movement of the first release body constituted as a slider body, said first release body being assembled with the base to be capable of sliding movement from one side of the leg shaft toward the other side and to allow a striking part of the first release body to push the lock body in the release position; and said base has a shaft bearing hole for a rotating shaft of the second release body which is constituted as a rotating body, said second release body being assembled with the base to be capable of rotating through the rotating shaft, and having an operating part on one side of the rotating shaft and a striking part on the other side, to allow the striking part to push the lock body from above in the release position by a release operation of lifting up the operating part.

* * * * *